United States Patent [19]
Kasai et al.

[11] Patent Number: 5,399,311
[45] Date of Patent: Mar. 21, 1995

[54] RADIAL ANISOTROPIC RING MAGNET WITH A SINUSOIDAL WAVEFORM AND PRODUCING METHOD THEREOF

[75] Inventors: Yasuaki Kasai, Nagoya; Hiyoshi Yamada, Iwakura; Norio Yoshikawa, Nagoya, all of Japan

[73] Assignee: Daido Tokushuko Kabushiki Kaisha, Aichi, Japan

[21] Appl. No.: 975,081

[22] Filed: Nov. 12, 1992

[30] Foreign Application Priority Data

Nov. 15, 1991 [JP] Japan .................. 3-328156

[51] Int. Cl.⁶ .................. H01F 13/00; H01F 41/16
[52] U.S. Cl. .................. 419/28; 419/2; 419/5; 419/38; 419/41; 419/51; 148/103; 148/108; 148/122; 264/DIG. 58; 335/302
[58] Field of Search ............ 419/2, 5, 28, 38, 41, 419/51; 148/103, 108, 122, 301; 264/DIG. 58; 335/302; 310/154, 156

[56] References Cited

U.S. PATENT DOCUMENTS

| | | | |
|---|---|---|---|
| Re. 34,229 | 4/1993 | Shimizu et al. | 335/302 |
| 4,417,167 | 11/1983 | Ishii et al. | 310/67 R |
| 4,678,616 | 7/1987 | Kawashima | 264/24 |
| 4,812,692 | 3/1989 | Arita | 310/49 R |
| 5,080,731 | 1/1992 | Tabaru et al. | 148/103 |
| 5,145,614 | 9/1992 | Kuruda | 264/24 |
| 5,195,377 | 3/1993 | Garshelis | 73/779 |
| 5,204,569 | 4/1993 | Hino et al. | 310/154 |
| 5,283,544 | 2/1994 | Sakurai et al. | 335/297 |

FOREIGN PATENT DOCUMENTS

| | | |
|---|---|---|
| 0369462 | 5/1990 | European Pat. Off. . |
| 1169708 | 1/1959 | France . |
| 55-165607 | 12/1980 | Japan . |
| 60-124812 | 7/1985 | Japan . |
| 62-224916 | 10/1987 | Japan . |
| 2-308512 | 12/1990 | Japan . |

*Primary Examiner*—Donald P. Walsh
*Assistant Examiner*—Daniel Jenkins
*Attorney, Agent, or Firm*—Bacon & Thomas

[57] ABSTRACT

A magnet is formed as a ring magnet and magnetized by radial application of a magnetic field while the intensity of the magnetic field is changed periodically along the circumference of the ring magnet to give a circumferentially sinusoidal waveform distribution of magnetic flux density to the ring magnet in the magnetized state of the magnet.

3 Claims, 3 Drawing Sheets

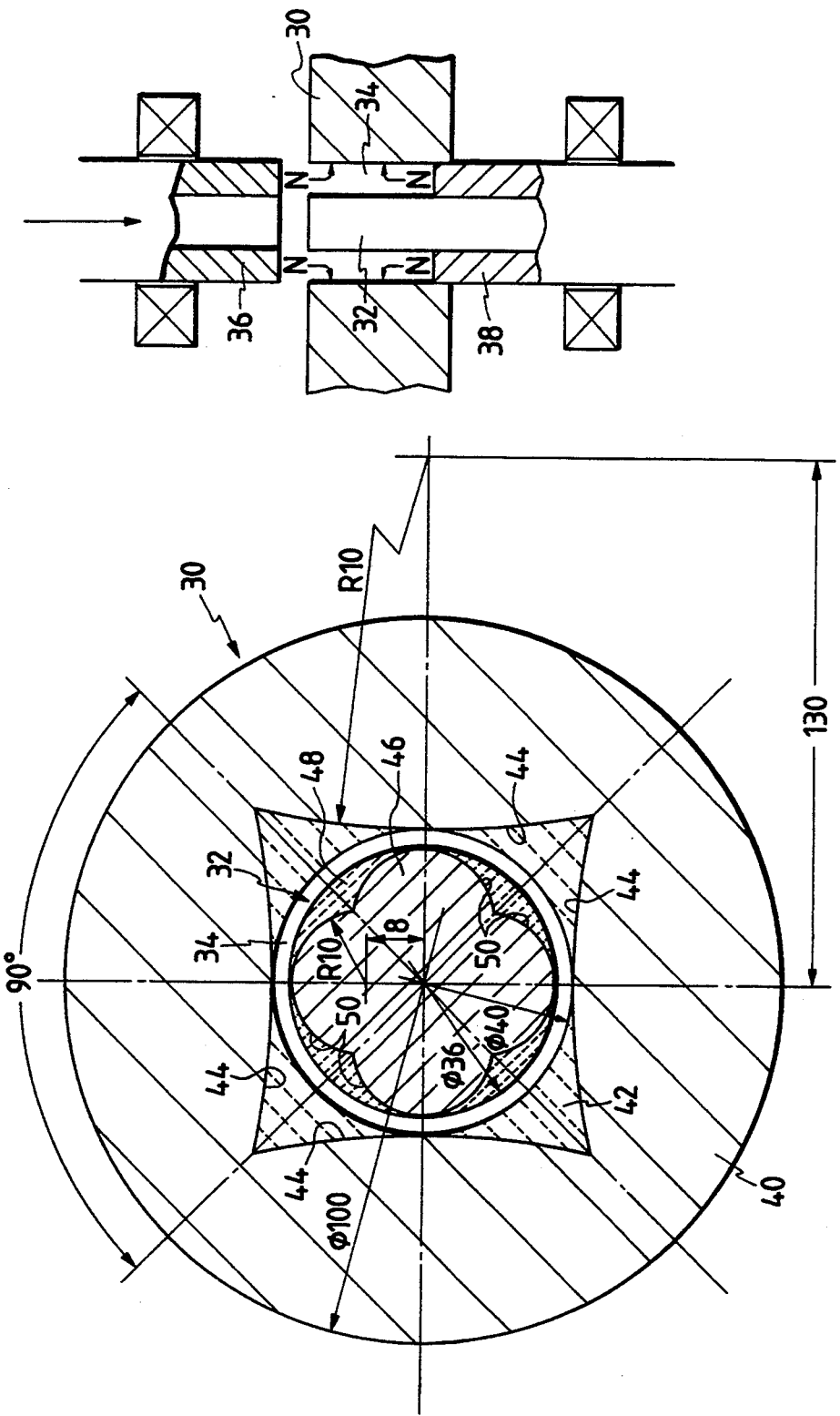

RADIAL ANISOTROPIC RING MAGNET WITH A SINUSOIDAL WAVEFORM AND PRODUCING METHOD THEREOF

BACKGROUND OF THE INVENTION

The present invention relates a radial anisotropic ring magnet and a producing method thereof, and more particularly, relates to a ring magnet having a circumferentially formed sinusoidal waveform distribution of magnetic flux density and a producing method thereof.

An AC servomotor which can generate constant torque regardless of the rotational angle of a rotor has been required. To satisfy this requirement, it is theoretically said that a rotor-side magnet must have a sinusoidal waveform distribution of magnetic flux density along the circumference thereof.

Therefore, as a conventional method, circular blocks (eccentric segments) 100 each having its thickness changed along the circumference thereof as shown in FIG. 4 are stuck to one another in the rotor side to form a ring as a whole (in this example, four circular blocks 100 are circumferentially stuck to one another) so that a sinusoidal or substantially sinusoidal waveform distribution of magnetic flux density is provided correspondingly to the change of the thickness of the circular blocks 100.

In the case where a plurality of circular blocks 100 are stuck to one another as described above to form a ring magnet, however, the number of the circular blocks 100 must be made to correspond to the number of magnetic poles. For example, four circular blocks must be stuck to one another when the number of magnetic poles is four, and eight circular blocks must be stuck to one another when the number of magnetic poles is eight. Much labor as well as a lot of steps are required for sticking the circular blocks 100 to one another.

Further, in the case where the circular blocks 100 are stuck to one another as described above, there is a risk that the circular blocks may be separated when the motor is in use. In addition, a problem may arise on positional accuracy in sticking of the circular blocks 100.

That is, it is difficult to eliminate the shifting of the sticking positions of the circular blocks 100 perfectly. This causes cogging in the motor, that is, rotational unevenness.

SUMMARY OF THE INVENTION

The present invention is provided to solve the aforementioned problems.

According to a first aspect of the present invention, provided is a radial anisotropic ring magnet characterized in that a magnet is ring-like formed and at the same time a magnetic field is radially applied to the ring magnet so as to magnetize the ring magnet while changing the intensity of the magnetic field periodically along the circumference of the ring magnet to thereby give a circumferentially sinusoidal waveform distribution of magnetic flux density to the ring magnet in the magnetized state of the ring magnet.

According to another aspect of the present invention, provided is a method of production of a magnet by applying plastic working to a preformed material to obtain a final magnet shape and then magnetizing the preformed material by radially applying a magnetic field thereto to thereby exhibit predetermined magnetic characteristic correspondingly to the degree of the plastic working, characterized by the steps of: forming the preformed material like a ring having its wall thickness changed circumferentially periodically; and applying plastic working to the preformed material to make the wall thickness of the ring even so that the degree of working changes circumferentially to thereby produce a radial anisotropic ring magnet having a circumferentially sinusoidal waveform distribution of magnetic flux density.

According to a further aspect of the present invention, provided is a method for production of a radial anisotropic ring magnet by successively applying press molding, sintering and magnetization to magnetic material powder while applying a magnetic field to the magnetic material powder, characterized in that a ring is formed from the magnetic material powder while radially applying a magnetic field to the magnetic material powder and at the same time changing the intensity of the magnetic field circumferentially periodically to thereby give a circumferentially sinusoidal waveform distribution of magnetic flux density to the ring in the magnetized state thereof.

In recent years, rare earth metal magnets having magnetic anisotropic have been noticed and considered to be applied to various fields.

In application of this type rare earth metal magnet to an AC servomotor, magnetization is performed by radially applying a magnetic field to the rare earth metal magnet.

According to the first aspect of the present invention, a circumferentially sinusoidal waveform distribution of magnetic flux density is given to a magnet in the magnetized state thereof by preliminarily forming the magnet as a ring magnet and magnetizing the ring magnet in a radial magnetic field while changing the intensity of the magnetic field irregularly along the circumference of the ring magnet, that is, periodically strongly or weakly along the circumference of the ring magnet.

The magnet thus produced has a single form, that is, an integral type ring form. Accordingly, not only it is easy to mount the magnet onto a shaft of the rotor, but the mounting can be performed by a smaller number of steps.

Unlike the case of sticking circular blocks to one another, there is no risk such as separation of the stuck magnet in use of the motor.

Further, according to the present invention, it is confirmed that a good sinusoidal waveform distribution of magnetic flux density can be given to a magnet. There arises an effect in that unevenness of rotational torque in the motor can be suppressed to thereby make it possible to apply the magnet to the field of robots which requires high-accurate control.

As a method of producing the aforementioned rare earth metal magnet, there is a method comprising the steps of: applying hot plastic working to a preformed material to give magnetic anisotropy thereto; and applying a magnetic field in the direction of the anisotropy to the preformed material to perform magnetization.

According to the second aspect of the present invention, the degree of working is changed circumferentially to give a change to magnetic characteristic by forming a preformed material described above like a ring having thickness changed circumferentially periodically and then applying plastic working to the ring to form a ring having even thickness. That is, the waveform of magnetic flux density along the circumference of the ring is made to be sinusoidal.

The magnet produced according to the second aspect of the present invention has also a single form, that is, an integral type ring form. Accordingly, in application of the magnet to an AC servomotor, not only the magnet can be mounted on the rotor by a small number of steps but there is no risk such as separation of the magnet in use, in the same manner as the first aspect of the present invention.

The third aspect of the present invention relates to a method of producing a magnet by successively applying press molding and sintering to magnet material powder.

As a method of producing the aforementioned rare earth metal magnet, there is a method comprising the steps of: pulverizing an alloy ingot to form powder; and successively applying press molding, sintering and magnetization to the powder in a mold while applying a magnetic field thereto.

In this case, magnetic flux density after magnetization can be formed circumferentially unevenly by molding the powder like a ring while applying a radial magnetic field thereto and changing the intensity of the magnetic field along the circumference thereof. Thus, a sinusoidal distribution of magnetic flux density can be given to the ring magnet.

The magnet produced according to the third aspect of the present invention has also a single form, that is, an integral type ring form. Accordingly, not only the magnet can be easily mounted to the rotor but there is no risk such as separation of the magnet in use.

BRIEF DESCRIPTION OF THE DRAWINGS

FIGS. 3A and 3B are views for explaining a method according to a third embodiment of the present invention.

DETAILED DESCRIPTION OF THE INVENTION

Preferred embodiments of the present invention will be described below in detail to make the features of the invention more clear.

Embodiment 1

Figure 1:
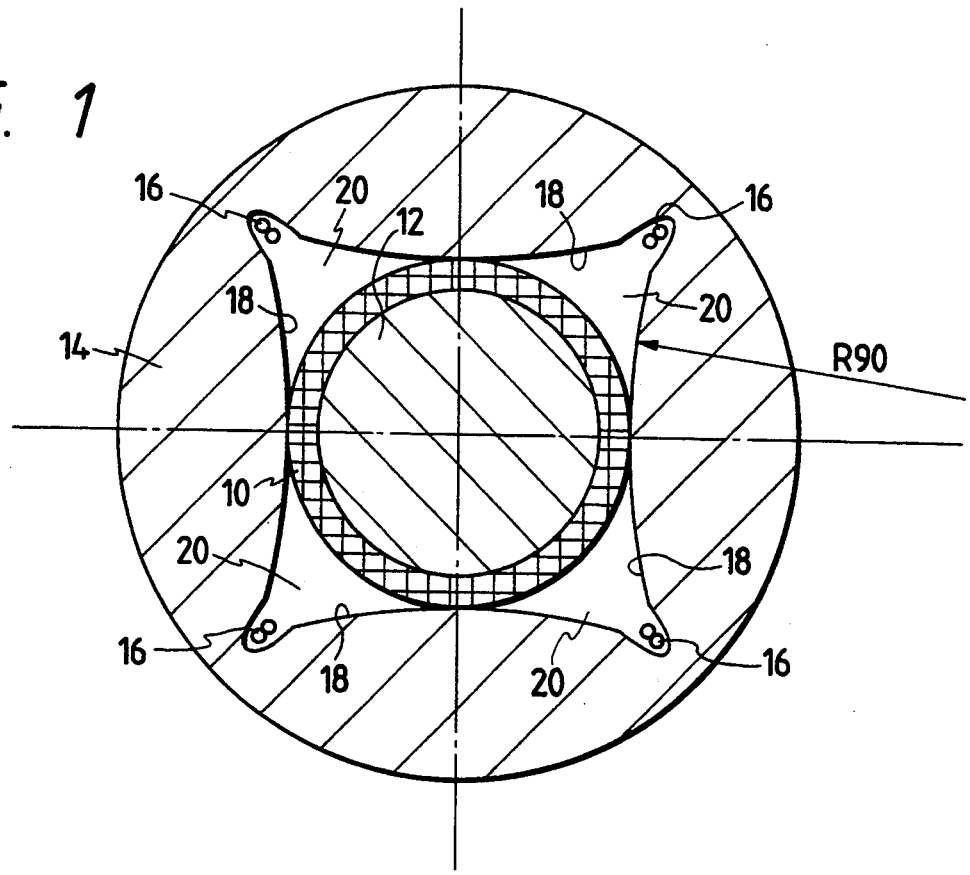
FIG. 1 is a view for explaining a method according to a first embodiment of the present invention.

Rare earth metal magnet material powder composed of Nd, Fe, Co and B was subjected to hot pressing and then subjected to backward extrusion to thereby prepare a ring magnet 10 having an outer diameter of 40 mm$\phi$, an inner diameter of 36 mm$\phi$ and a length of 20 mm (see FIG. 1).

Then, the ring magnet was disposed between an inner magnetizing yoke 12 and an outer magnetizing yoke 14 as shown in the drawing and then magnetized by application of the magnetic field formed radially by passing an electric current through coils 16.

Here, the inner circumferential side of the outer magnetizing yoke 14 was constituted by four circular surfaces 18 so that not only gaps 20 were formed between the inner circumferential side of the outer yoke 14 and the outer circumferential side of the ring magnet 10 but the depth of the gaps 20 changed circumferentially periodically.

In the case where radial magnetization of the ring magnet 10 is performed by using such magnetizing yokes 12 and 14, the magnet 10 is magnetized intensively at positions where the inner yoke 12 and the outer yoke 14 are nearest to each other, that is, at positions where the gaps 20 are shallowest, but magnetized relatively weakly at positions where the inner yoke 12 and the outer yoke 14 are farthest from each other, that is, at positions where the gaps 20 are deepest.

As a result, the magnetic flux density of the magnet thus prepared has a predetermined distribution along the circumference. Accordingly, a circumferentially sinusoidal distribution of magnetic flux density can be given to the ring magnet 10 by controlling the depth and pattern of the gaps 20.

Embodiment 2

Figure 2:
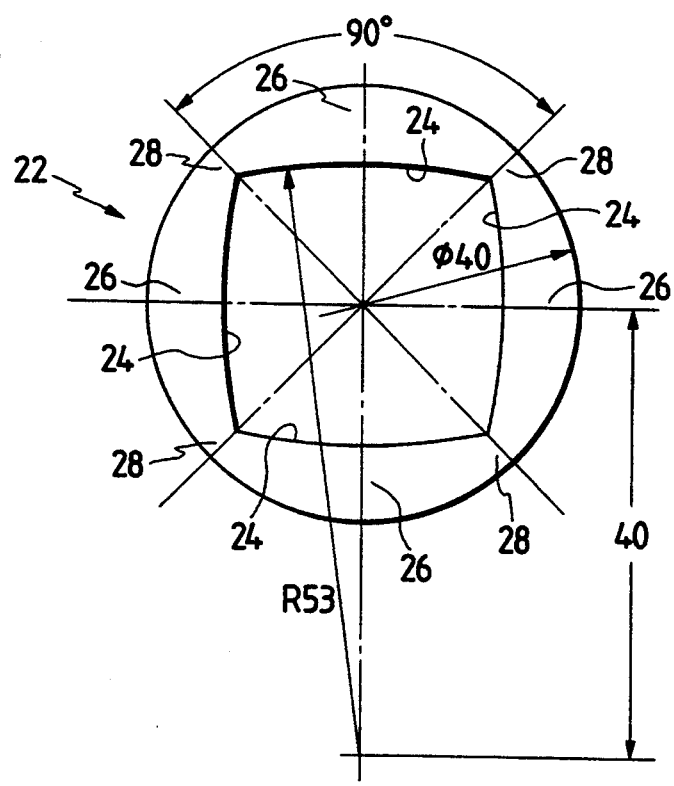
FIG. 2 is a view for explaining a method according to a second embodiment of the present invention.

Rare earth metal magnet material powder composed of Nd, Fe, Co and B was subjected to hot pressing to thereby prepare a ring preformed material 22 (outer diameter: 40 mm$\phi$) as shown in FIG. 2.

The inner circumferential side of the ring preformed material 22 was constituted by four circular surfaces 24 (circular arcs with a radius of 53 mm) so that the wall thickness thereof changed circumferentially periodically.

Then, the preformed material 22 was subjected to backward extrusion to thereby prepare a radial anisotropic ring magnet having the same structure as Embodiment 1.

Here, thick wall portions 26 of the preformed material 22 are higher in the degree of working, while thin wall portions 28 thereof are lower in the degree of working. As a result, the thick wall portions are higher in the degree of orientation (in magnetic domain) of particles, and the thin wall portions are relatively lower.

That is, the degree of orientation changes periodically along the circumference of the ring magnet so that it becomes higher or lower.

Then, the ring magnet is set in a magnetizing yoke so that the portions higher in the degree of working come to the center of poles, and then the ring magnet is magnetized by application of a magnetic field thereto. Thus, a magnet having a sinusoidal waveform distribution of magnetic flux density is produced.

Embodiment 3

A ring space between an outer mold 30 and an inner mold 32 as shown in FIGS. 3A and 3B was filled with rare earth metal magnet material powder composed of Nd, Fe, Co and B. Then, while a radially oriented magnetic field was applied to the powder, the powder was pressed by using molds composed of the outer and inner molds 30 and 32 and a pair of punches 36 and 38.

Here, the outer mold 30 was constituted by a portion of ferromagnetic material 40 and a portion of non-magnetic material 42. The inner circumferential side of the ferromagnetic material 40 portion was constituted by four circular surfaces 44 so that the thickness of the non-magnetic material 42 portion changed circumferentially periodically.

On the other hand, the inner mold 32 was also constituted by a portion of ferromagnetic material 46 and a portion of non-magnetic material 48. The outer circumferential side of the ferromagnetic material 46 portion was constituted by four circular surfaces 50 so that the thickness of the non-magnetic material 48 portion changed circumferentially periodically.

The non-magnetic material 42 portion of the outer mold 30 and the non-magnetic material 48 portion of the inner mold 32 were disposed so that not only thick wall portions faced to each other but thin wall portions or portions where non-magnetic material was absent faced to each other.

When a magnetic field was applied radially with use of such molds, the magnetic field became weakest at the thick wall portions of non-magnetic materials 42 and 48 whereas it became most intensive at the thin wall portions of non-magnetic materials 42 and 48 or at the portions where non-magnetic material was absent. That is, the magnetic field changed continuously from the weakest portions to the most intensive portions.

Accordingly, when press molding was performed in the aforementioned magnetic field, the orientation of particles changed circumferentially continuously and periodically.

After the above press molding was performed, sintering and heating were performed to prepare a radial anisotropic ring magnet having the same structure as Embodiment 1. Succeedingly, magnetization was performed according to an ordinary method.

Thus, a ring magnet having a sinusoidal waveform distribution of magnetic flux density formed circumferentially was produced.

[Comparative Test]

Comparative test was applied to the magnets produced in the Embodiments 1 to 3 and a magnet having a structure in which blocks were stuck to one another to form a ring. Results of the comparative test were as shown in Table 1.

TABLE 1

|  | Number of Times for Sticking to Shaft | Cogging | Distortion ratio of Flux Density Waveform to Sine Wave |
| --- | --- | --- | --- |
| Eccentric Segment | 100% | 100% | 100% |
| Example 1 | 10% | 10% | 20% |
| Example 2 | 10% | 20% | 100% |
| Example 3 | 10% | 15% | 80% |

Figure 4A:
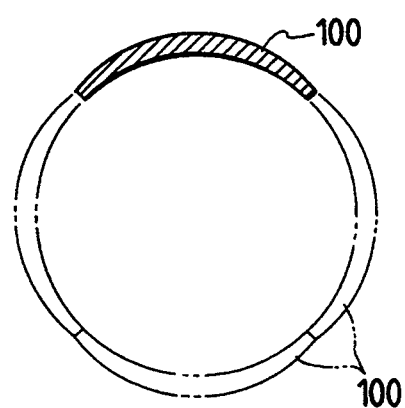
FIGS. 4A and 4B are views for explaining the background of the invention.
Figure 4B:
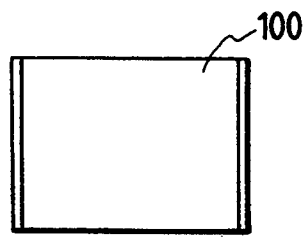

In the table, numerical values are expressed as values (%) relative to the values (100%) of the magnet constituted by blocks shown in FIG. 4.

It is apparent from the results that the present invention provides a ring magnet having a distribution of magnetic flux density not inferior to the conventional magnet and molded into one body to obtain less irregularity of rotational torque, and that the ring magnet is simplified in the number of steps for mounting the rotor onto the shaft.

Although the embodiments of the present invention have been described in detail, it is to be understood that the present invention is not limited thereto and that various changes may be made on knowledge of those skilled in the art within the spirit of the invention.

What is claimed is:

1. A method of producing a rare earth metal radial anisotropic ring magnet, comprising the steps of:
    forming by hot pressing and backward extrusion a ring-shaped preformed material having its wall thickness changed circumferentially and periodically;
    applying plastic working to said ring-shaped preformed material to make the wall thickness of said preformed material even so that the degree of said plastic working changes circumferentially; and
    magnetizing said preformed material by radially applying a magnetic field to give predetermined magnetic characteristic correspondingly to the degree of said plastic working to said preformed material so that said radial anisotropic ring magnet having a circumferentially sinusoidal waveform distribution of magnetic flux density is produced.

2. A method of producing a rare earth metal radial anisotropic ring magnet, comprising the steps of:
    press molding a magnetic material powder into a ring while radially applying a magnetic field having an intensity varied circumferentially and periodically to said magnetic material powder;
    sintering said ring of said press molded magnetic material powder; and
    magnetizing said ring of said magnetic material powder to produce said radial anisotropic ring magnet having a circumferentially sinusoidal waveform distribution of magnetic flux density.

3. A method of producing a radial anisotropic ring magnet as claimed in claim 2, wherein orientation of particles in said magnetic material powder is changed continuously and periodically in accordance with the intensity of the magnetic field applied to said magnetic material powder in the press molding step, and said sinusoidal waveform distribution of magnetic flux density is formed in accordance with the change of the orientation of particles in the magnetizing step.

* * * * *